Patented Sept. 6, 1949

2,481,307

UNITED STATES PATENT OFFICE 2,481,307

STABILIZATION OF HALOGEN-CONTAINING PLASTIC COMPOSITIONS

Philip James Garner, Hooton, Wirral, and Peter Gordon Croft-White, Chester, England, assignors to Shell Development Company, San Francisco, Calif., a corporation of Delaware No Drawing. Application April 11, 1947, Serial No. 740,974. In Great Britain May 2, 1946

8 Claims. (Cl. 260—45.75)

This invention relates to heat and light stabilized plastic compositions containing polymers which evolve hydrogen halide upon decomposition. More specifically, the invention relates to plastic compositions, containing polymers that normally become discolored and undergo a change of physical properties when exposed to natural or artificial light and heat in the ordinary course of their use, which have been heat and light stabilized by the addition of small amounts of certain metal salts of substituted salicylic acids. In one of its most specific embodiments the invention relates to heat and light stabilized vinyl resins, which contain polymers of halogenated vinyl compounds and small amounts of stabilizers consisting of oil soluble substituted salicylates of metals which do not catalyze the evolution of hydrogen halide from the polymer.

As the terms are employed throughout the specification and in the appended claims, a "heat and light stabilized" plastic composition, refers to a composition containing an additive substance, the presence of which causes the composition to exhibit greater resistance to the changes in physical properties which are initiated by the effects of heat and/or light radiation than are characteristic of otherwise identical compositions which do not contain the additive substance.

Thermoplastic resins containing polymers formed by the polymerization of monomers in which aliphatic carbon atoms are attached to halogen atoms, particularly the resins of the vinyl family, are considerably restricted in application because of their limited stability when subjected to the effects of light radiation, or to elevated temperatures. This instability is well known and has long been a problem in the art of manufacturing plastic compositions. Many careful investigations have been made of the causes and character of this commonly occurring failure, as, for example, the decomposition of compositions containing polyvinyl chloride. It has been found that in both the thermal and photochemical decomposition of polyvinyl chloride, the polymer becomes dark and eventually black while at the same time hydrogen chloride is liberated. The decomposition appears to be auto-catalytic, the presence of the evolved hydrogen chloride accelerating the reaction which further liberates hydrogen chloride. It has long been common practice to inhibit this decomposition reaction by the incorporation into the plastic composition of a "stabilizer" which will combine with the hydrogen chloride produced, or otherwise render it inoperative as a catalyst. Many compounds of widely diversified types have been employed in this manner: inorganic compounds as the alkali and alkaline earth metal carbonates, oxides, etc., antioxidant compounds as the substituted phenols, napthols, etc., the alkali metal salts of fatty acids, aromatic amines as 1,4-di-aminobenzene, and numerous other materials. Inorganic materials, particularly white lead or basic lead carbonate, impart considerable heat stability to vinyl resins and are commonly employed in this connection, but since the inorganic materials, as well as certain of the metal salts of fatty acids, are relatively insoluble in the plasticizers commonly employed, it is seldom possible to obtain transparent compositions containing them as stabilizers. The various organic materials, particularly nitrogenous compounds, impart light stability but, as in the case of 1,4-di-aminobenzene in polyvinyl chloride many organic compounds are subject to forming cross-links between the polymer chains with a resultant change in the physical properties of the polymer.

While heat and light stabilization can be obtained by the incorporation of several stabilizing materials selected for their particular effectiveness in the presence of heat or light, this procedure has in the past been limited in application by the generally low oil-solubility and/or compatibility of the various stabilizing materials. Care must be taken in regard to the compatibility limits for each of the stabilizers, not only with the polymer and the other stabilizers but with the plasticizer which often forms a substantial portion of the compositions. A composition which is both a heat and light stabilizer must exhibit a wide variety of relatively unrelated physical and chemical properties such as: compatibility with the polymer and plasticizer in the proportions required for effective stabilization, low volatility to such a degree that there is no loss of stabilizer either during the molding and/or curing processes or over the period of the useful life of the plastic composition, the property of combining with or otherwise preventing the liberated hydrogen halide from catalyzing further decomposition of the polymer without increasing the rate of evolution of the acid, etc. In addition, many of the most important uses of the halogen-containing resins require special properties, such as transparency, which can only be obtained when the stabilizers employed are soluble in, as well as compatible with, the plasticizers used, or such as electrical insulating properties, which necessitate the incorporation of a stabilizing material which causes little or no deterioration of the properties of water adsorption, volume resistivity, specific inductance capacity, power factor, etc., of the stabilized composition.

It has now been discovered that the substituted salicylic acid salts of certain metals form oil soluble materials which are therefore soluble in a majority of the commonly employed plasticizers and which have the unobvious property of imparting heat and light stability to halogen-containing polymers without causing a loss in the transparency or electrical properties such as dielectric strength of the plastic composition. It has further been discovered that the salts formed by the partial or complete neutralization of substituted salicylic acids with metals which exhibit a minimum valence of two, when incorporated into plastic compositions, impart improved qualities of resistance to a thermo- or photochemical decomposition accompanied by the evolution of a hydrogen halide. When the atomic structure of the metal will allow the formation of coordinate bonds, as the hydrogen bond, in addition to the normal ionic bonds thereby allowing the formation of chelate rings of varying stability in the normal, basic and inner substituted salicylate salts as might be represented by the following general formulas, respectively, where

represents a substituted salicylate ion and M represents a divalent metal,

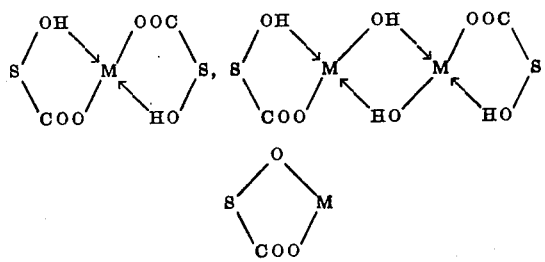

especially when the chelate rings appear strong as indicated by the aromatic nature of the salt, particularly valuable heat and light stabilization is imparted to the plastic composition in addition to unimpaired or even improved electrical properties.

The normal, basic or inner substituted salicylate salts exhibit many physical and chemical properties characteristic of the aromatic compounds and are thus soluble and/or compatible with an extremely wide range of polymeric materials and the commonly employed plasticizers. These compounds may therefore be employed as stabilizers for a wide variety of halogen containing plastic compositions, being particularly suitable for compositions containing polymers or copolymers in which one or more components are formed from monomers as a vinyl halide, a halogenated vinyl type aromatic compound such as a styryl halide, in which the halogen atoms are preferably attached to the aliphatic portion of the compound, a vinylidene dihalide, a vinyl type ester of a halogen containing acid, a halogen containing vinyl alcohol ester of an organic acid, or the halogen containing polymers formed by the halogenation of the partially or completely polymerized material. Illustrative examples of individual polymeric materials to which the invention is applicable include, polyvinyl chloride, polyvinyl bromide, interpolymers of vinyl chloride and vinyl acetate, chlorinated polyvinyl chloride chlorinated rubber, brominated rubber, chloroprene polymers and copolymers, chlorostyrene polymers and copolymers, fluoroethylene polymers and copolymers, chloroacrylic acid ester polymers and copolymers, dichlorostyrene polymers and copolymers, and the like.

The present invention may therefore be generally stated as relating to plastic compositions containing polymers which are subject to decomposition and the evolution of hydrogen halide when exposed to the effects of heat and/or light which have been heat and light stabilized by the incorporation into the composition of a small amount of a substituted salicylic acid salt of a metal having a minimum valence of two, and particularly to the salts of metals having a minimum valence of two which form chelate rings, such as the metals of Group IIA of the Periodic Table. While the formation of chelated rings as illustrated above is thought to impart the improved properties of solubility, compatibility etc., to the substituted salicylate stabilizers the invention is not limited to the formation of compounds of their particular structures.

As stated above, a substance which is a suitable stabilizer for a plastic composition must possess a wide variety of physical and chemical properties which are not, in the ordinary chemical sense, closely related. While metal salts of weak organic acids are generally related more closely by the properties of the metal, it has been found that substituted salicylate salts of certain closely related metals may have widely divergent stabilizing properties. For example, while the substituted salicylate salts of the metals of Group IIA form particularly valuable stabilizers and plastic compositions containing them exhibit excellent heat and light stability in all of the measurable physical properties, the salts of a closely related element of Group IIB, zinc, impart good resistance to a change in electrical properties over long exposures at moderately elevated temperatures, but do not improve the resistance of the plastic thermal decomposition at high temperatures. On the other hand, such totally unrelated metals as lead and nickel form substituted salicylate stabilizers which impart to the plastic compositions good heat and to varying extents good light stability. The metals having a minimum valence of two which may suitably be employed to form the substituted salicylate salt stabilizers of the present invention, include such sepresentative examples, as, nickel, lead, beryllium, magnesium, calcium, strontium, cadmium and barium. The particularly suitable heat and light stabilizers are the oil soluble, normal, basic or "inner" substituted salicylate salts of the elements of Group IIA of the Periodic Table, i. e., the alkaline earth metals, which are beryllium, magnesium, calcium, strontium, and barium; while suitable heat and, to varying extents, light stabilizers are formed by the substituted salicylate salts of metals with a minimum valence of two such as lead and nickel.

Substituted salicylic acids which are suitable to form the organic acid portion of the substituted salicylate salts are those in which the benzene nucleus, in addition to the carboxyl and hydroxyl groups in the 1 and 2 positions, contains at least one substituent group in the 3,4,5 or 6 position of the ring. The substituent groups may consist of a plurality of attached groups or a single group; in any case, the total number of carbon atoms contained in the substituent groups being between about 5 and 18 carbon atoms either in a single group or in a plurality of groups. The substituent groups may be a plurality of low molecular weight alkyl radicals as, for example, ethyl, propyl, butyl, pentyl, etc., or any combination thereof with alkyl radicals of a higher molecular weight. Unsaturated substituent groups have an added advantage of providing additional possible hydrogen halide removing reactions by the addition of the halogen acid to the unsaturated linkages as, for example, in attached vinyl, allyl, propenyl, butenyl, propynyl, butynyl, cyclopentenyl, butadienyl, cyclopentadienyl, cyclohexadienyl, etc., radicals. Attached groups consisting of a plurality of branched chain alkyl or high molecular weight straight chain alkyls attached singly or in combination with other alkyl radicals are particularly suitable; for example, a plurality of radicals as isopropyl, isobutyl, isopentyl, 2,2-dimethyl pentenyl, isopropenyl, etc., or a single high molecular weight alkyl radical or a combination containing alkyl radicals as octyl, nonyl, octadecyl, lauryl, palmyl, stearyl, oleyl, etc. Suitable substituent groups may consist of groups containing other atoms than only hydrogen and carbon as, for example, oxygen, and may be the only substituent group or may be attached to a salicylate nuclei containing other attached groups, examples of such non-hydrocarbyl substituent groups being ethoxyl, propoxyl, isopentoxyl, butoxyl, pentoxyl, isopropoxyl, isobutoxyl, acetoyl, pentinoyl, stearoyl, benzoyl, oleoyl, palmitoyl, pelargonoyl, propeolyl, propionyl, o-, m- or p-toluyl, vanilloyl, veratroyl, xyloyl, chaulmoogroyl, cinnamoyl, crotonyl, cumoyl, 2-furoyl, 3-furoyl, hydrocaproyl, hydrocinnamoyl, etc.

Illustrative examples of the substituted salicylate salts which have been found to be particularly effective heat and light stabilizers for resins of the vinyl family containing polymers and/or copolymers formed from halogenated vinyl monomers as, for example, from vinyl chloride, vinylidene chloride, vinyl bromide, chlorovinyl ethers, esters and the like, are the alkaline earth metal normal, basic and "inner" salts of stearoyl salicylic acid, octadecyl salicylic acid, octyl salicylic acid and di-isopropyl salicylic acid, such as beryllium stearoyl, octyl, octadecyl or di-isopropyl salicylate, magnesium stearoyl, octyl, octadecyl or di-isopropyl salicylate, calcium stearoyl, octyl, octadecyl or di-isopropyl salicylate, strontium stearoyl, octyl, octadecyl or di-isopropyl salicylate, cadmium stearoyl, octyl, octadecyl or di-isopropyl salicylate, and barium stearoyl, octyl, octadecyl or di-isopropyl salicylate. Illustrative examples of other substituted salicylate salts which are suitable heat and/or light stabilizers in accordance with the present invention are lithium stearoyl salicylate, lithium octodecyl salicylate, lithium octyl salicylate, lithium di-isopropyl salicylate, nickel stearoyl salicylate, nickel di-isopropyl salicylate, nickel octyl salicylate, nickel octodecyl salicylate, lead di-isopropyl salicylate, lead octyl salicylate, lead octodecyl salicylate, lead stearoyl salicylate, magnesium di-butyl salicylate, magnesium di-isopentyl salicylate, calcium oleoyl salicylate, barium palmitoyl salicylate, calcium tri-isopropyl salicylate, calcium 3-propyl-5-isopropyl salicylate, magnesium 3-ethyl-5-isopentyl salicylate, beryllium-3-isopropyl-5-valeryl salicylate, lead tributyl salicylate, magnesium 3-isopropyl-5-allyl salicylate, calcium 3-isopropyl-5-butoxy salicylate, etc., and their homologues and analogues. These substituted salicylic acids may be prepared by any of the methods commonly used in the synthesis of the general class of compounds.

An illustrative example of the preparation of di-isopropyl salicylic acid is the following preparation from di-isopropyl ether. However, the acid may also be readily obtained from isopropyl alcohol by well known reaction steps.

*Preparation of 3,5-di-isopropyl salicylic acid*

To 245 g. (2.4 mols) of di-isopropyl ether, 510 g. of 92% sulfuric acid (4.8 mols) were added over a period of 10 minutes. The temperature of the solution was 70° C. when the addition was completed. The mixture was then heated to 90° C., at which time 276 g. (2 mols) of salicylic acid were added in small portions so that the temperature did not rise above 100° C.; this addition required about 1 hour. The mixture was then maintained at 95° C. for 15 hours, cooled, and 400 mls. of gasoline B. P. 80° C.–130° C. and about 500 mls. of water were added. The mixture was then stirred until all of the reaction products were dissolved. The sulfuric acid layer was then separated and the gasoline layer washed with an approximately equal volume of water. The gasoline layer was then shaken with 600 mls. of 10% caustic solution, and the aqueous sodium salt solution separated from the gasoline layer. The salt solution was washed with 100 mls. of gasoline, acidified with 4N sulfuric acid, and the di-isopropyl salicylic acid which separated was filtered from the solution, washed and dried. A yield of 300 g. or 69% of the theoretical yield was obtained. The molecular weight, determined by titration with caustic soda to a phenolphthalein end point, was found to be 221 (calculated 222).

The normal, basic and "inner" substituted salicylate salts of the present invention may be prepared by any of the well known methods of obtaining the metal salts of weak organic acids. The following examples are given for the purpose of illustration and the scope of the present invention is in no way limited to the specific reactions and compounds illustrated below.

*Preparation of normal calcium 3,5-di-isopropyl salicylate*

An aqueous solution of potassium 3,5-di-isopropyl salicylate was prepared by dissolving by warming 22.2 g. of the acid in 150 mls. distilled water containing 5.6 grams of potassium hydroxide. The solution was then cooled and treated with 10.9 g. of calcium chloride hexahydrate in 150 mls. of distilled water. A thick white precipitate formed and was filtered off and dried in a vacuum desiccator. The calcium content, as determined by analysis of the dry acid, was 7.1%, the theoretical calcium content being 8.3% for the normal salt of the formula

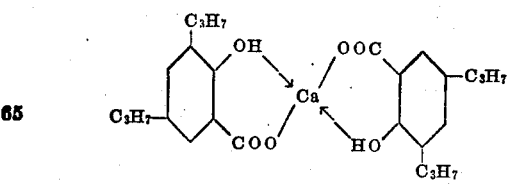

*Preparation of basic beryllium 3,5-di-isopropyl salicylate*

An aqueous solution of beryllium chloride was prepared by warming 4 g. of beryllium in 38 mls. of 10N hydrochloric acid for 6 hours on a water bath. The resultant mixture was filtered while hot diluted with 100 mls. of water and treated with 50 g. of 3,5-di-isopropyl salicylic acid (½ equivalent per equivalent of beryllium chloride present) in 100 mls. of 95% ethyl alcohol. A further 150 mls. of ethyl alcohol was required to form a homogeneous solution. The alcohol was distilled from the solution over a water bath, and precipitation of the basic salt occurred after 50 mls. of the alcohol-water-hydrochloric acid aezotrope had distilled. The precipitate was filtered from the hot solution, transferred to a flask containing 200 mls. of 95% ethyl alcohol and refluxed gently for 15 minutes to free it from 3,5-di-isopropyl salicylic acid and filtered from the hot solution. After drying under vacuum the yield was found to be 53 g. and upon analysis was determined to contain 3.42% beryllium, the theoretical beryllium content being 3.6% for the basic salt of the formula

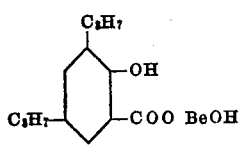

*Preparation of the inner salt of calcium 3,5-di-isoproyl salicylate*

A 50 gram sample of the normal calcium salt prepared as described above was heated in a Claisen flask at 180° C. for 48 hours under a stream of nitrogen. During this time carbon dioxide was continuously evolved. A vacuum distillation yielded 17.2 g. 2,4-di-isopropyl phenol (93% of theoretical) of d 20/4 0.9495 as compared with d 20/4 0.9497 found by Niewland and co-workers for 2,4-di-isopropyl phenol, J. Am. Chem. Soc. 55, 3402 (1933) ibid. 56, 2051 (1934). The residue 26.5 g. was analyzed and found to contain 15.0% of calcium, the theoretical calcium content being 15.4% for the inner salt of the formula

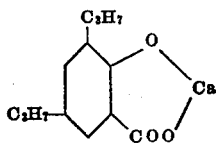

When the substituted salicylate salts are prepared by any of the commonly employed methods wherein approximately equivalent portions of acid and metal are used at temperatures under 140° C., the resulting product consists essentially of the basic salt. The use of larger mol portions of the acid at low temperatures results in primarily the normal salt, and upon heating or by reactions at temperatures above about 140° C., mainly the inner salts are produced.

The oil-soluble stabilizers of the present invention are soluble in, or compatible with the plasticizer, stabilizers, fillers, waxes, color pigments and other additive agents commonly employed in the manufacture of vinyl resin compositions, and may therefore be used in conjunction with these additives to produce compositions for specialized uses. The stabilizers of the present invention are effective when employed over a wide range of proportions, concentrations of from as little as 1% to as high as 10% or higher being suitable. Particularly valuable stabilized vinyl resin compositions are those containing from about 5 to about 7 per cent of substituted salicylic salt stabilizer in which the resulting compositions have been found to have properties of resistance to water adsorption, volume resistivity, specific conductance and power factor comparable with or better than the unstabilized polymers in addition to greatly improved heat and light stability.

The stabilizers of the present invention may be incorporated into the plastic composition previous to or during the melting or may be predissolved in the plasticizer or added by any of the other methods commonly employed in the art. The use of the stabilizers of the present invention greatly facilitates the preparation of transparent delicately dyed compositions which may be employed in the presence of light and elevated temperatures without alteration of the tint. The oil-soluble substituted salicylates in addition to being soluble in many plasticizers may be incorporated over a wide range of proportions without adversely affecting the properties of water adsorption of the plastic composition. By the use of the stabilizer of the present invention, many plastic compositions which could not be heat stabilized because they contained substances which would react with the commonly employed heat stabilizers, as the basic lead carbonates, etc., and consequently darken or change in color, can now be prepared with greatly improved qualities of heat and light stability.

EXAMPLE I

Comparative color stability of plasticized vinyl resin compositions containing various stabilizers.

Plastic compositions comprising in parts by weight 100 parts of polyvinyl chloride, 60 parts of plasticizer and 5 parts of the various stabilizers were molded into sheets from which uniform strips were cut. The strips were clamped to a turntable revolving at about 20 R. P. M. at a distance of 12 inches from a source of ultraviolet light. The strips were so clamped that one portion was protected from the light and a continuous draft of air was maintained to prevent excessive rises in temperature. Every 24 hours all of the strips were shaded from the light and a comparison made between the color of the exposed and unexposed portions of each strip. Two independent observers classified each of the stabilizers into five groups (I–V) in the decreasing order of their effectiveness in preventing a change in color, and whenever the classification was doubtful it was decided by a third observer.

*Group I* lead octyl salicylate
lead octadecyl salicylate
lead stearoyl salicylate

*Group II* calcium octyl salicylate
calcium octyl salicylate (inner salt)
calcium di-isopropyl salicylate

*Group III* barium di-isopropyl salicylate
barium octadecyl salicylate
strontium di-isopropyl salicylate

*Group IV* magnesium di-isopropyl salicylate
magnesium di-isopropyl salicylate (inner salt)
magnesium octadecyl salicylate
magnesium octadecyl salicylate (inner salt)
magesium stearoyl salicylate
beryllium di-isopropyl salicylate
nickel di-isopropyl salicylate

*Group V* basic lead carbonate
lithopons (barium and zinc sulfates)
barium sulfate
titanium dioxide

*Less than Group V*

Unstabilized composition

EXAMPLE II

Comparative thermal stability of plasticized vinyl resin compositions containing various stabilizers.

Plastic compositions containing, in parts by weight, 100 parts of polyvinyl chloride (corvic), 60 parts of plasticizer and 5 parts of the various stabilizer materials were molded into sheets which were cut into strips 35 mm. x 2 mm. x 2 mm. The strips, which varied only in the particular stabilizer material employed, were placed in test tubes in which was suspended a small container of O. I. M. silver nitrate solution in such a manner that the lower portion of the tube containing the sample could be heated in a water bath while the upper portion containing the silver nitrate remained approximately at normal temperature. The lower portion of the tubes was maintained at a temperature of 200° C. and the time of formation of a white precipitate of silver chloride recorded. The following table illustrates the times in minutes required to cause the decomposition of the plastic compositions containing the various stabilizers under these conditions of extreme temperature which decomposed the unstabilized composition in only eight minutes.

| Stabilizer | Time in minutes |
|---|---|
| Strontium di-isopropyl salicylate | 38 |
| Calcium di-isopropyl salicylate | 34 |
| Magnesium di-isopropyl salicylate (inner salt) | 31½ |
| Nickel di-isopropyl salicylate | 30½ |
| Calcium octyl salicylate | 28½ |
| Calcium octyl salicylate (inner salt) | 27 |
| Magnesium di-isopropyl salicylate | 25 |
| Magnesium stearoyl salicylate | 20 |
| Barium di-isopropyl salicylate | 19½ |
| Lead di-isopropyl salicylate | 19½ |
| Lead octyl salicylate | 18 |
| Magnesium octadecyl salicylate | 17½ |
| Barium octadecyl salicylate | 16 |
| Lead octadecyl salicylate | 14 |
| Lead stearoyl salicylate | 13 |
| Unstabilized | 8 |

EXAMPLE III

The electrical properties of plasticized vinyl resin compositions containing various stabilizers. Plastic compositions were prepared as in the preceding examples and molded into cylindrical discs which were maintained at a temperature of about 50° C. for 120 hours. The initial and final volume resistivities of the various discs are recorded below with the ratio of the final volume resistivity to the initial volume resistivity. The measurements were taken during each 24 hours of exposure and certain of the discs, for example, the composition containing basic lead carbonate, were found to vary considerably while those containing calcium and lead di-isopropyl salicylate and stearoyl salicylate, respectively, remained consistently high and those containing zinc octdecyl salicylate and 2,4-dimethyl-6-tertiary-butyl phenol remained consistently low. In certain cases the dielectric constant and power factor at 800 capacitants were measured on the compositions before the exposure at elevated temperatures.

| Stabilizer | Initial V. R. (ohms/cm.) | Final V. R. (ohms/cm.) | Final V. R. / Initial V. R. | Dielectric Constant (800 cps.) | Power Factor (800 cps.) |
|---|---|---|---|---|---|
| Calcium DIPS* | 1.85×10$^{13}$ | 1.68×10$^{13}$ | 0.91 | 3.75 | 0.081 |
| Basic lead carbonate | 1.64×10$^{13}$ | 1.45×10$^{13}$ | 0.88 | 4.13 | 0.112 |
| Barium DIPS | 1.58×10$^{13}$ | 1.38×10$^{13}$ | 0.87 | 3.96 | 0.10 |
| Lead SS** | 1.53×10$^{12}$ | 1.21×10$^{12}$ | 0.79 | 3.67 | 0.085 |
| Calcium OS*** | 1.61×10$^{13}$ | 1.20×10$^{13}$ | 0.75 | 3.77 | 0.089 |
| Lead OS | 1.38×10$^{12}$ | 9.18×10$^{11}$ | 0.67 | 4.20 | 0.121 |
| Lead DIPS | 3.08×10$^{12}$ | 1.79×10$^{12}$ | 0.58 | | |
| Barium OS | 2.31×10$^{13}$ | 1.20×10$^{13}$ | 0.52 | 3.91 | 0.087 |
| Calcium SS | 3.94×10$^{12}$ | 1.77×10$^{12}$ | 0.45 | | |
| Lead OdS**** | 3.16×10$^{12}$ | 1.18×10$^{12}$ | 0.37 | | |
| Unstabilized | 1.19×10$^{13}$ | 2.28×10$^{12}$ | 0.19 | 3.91 | 0.113 |
| 2,4-Dimethyl-6 tertiary butyl phenol | 5.25×10$^{12}$ | 6.3 ×10$^{11}$ | 0.12 | 3.75 | 0.084 |

*DIPS=di-isopropyl salicylate.
**SS=stearoyl salicylate.
***OS=octyl salicylate.
****OdS=octadecyl salicylate.

We claim as our invention:

1. A heat and light stabilized plastic composition containing polyvinyl chloride and between 1 and 10 per cent by weight of normal barium octylsalicylate based on the weight of polyvinyl chloride.

2. A heat and light stabilized plastic composition containing polyvinyl chloride and between 1 and 10 per cent by weight of basic lead octadecylsalicylate based on the weight of polyvinyl chloride.

3. A heat and light stabilized plastic composition containing polyvinyl chloride and an amount equal to between 1 and 10 per cent by weight based on the weight of polyvinyl chloride of the calcium inner salt of diisopropylsalicylic acid.

4. A heat and light stabilized plastic composition containing a polymeric vinyl halide and between 1 and 10 per cent by weight of an alkaline earth metal inner salt of diisopropylsalicylic acid based on the weight of polyvinyl halide.

5. A heat and light stabilized plastic composition containing at least one polymerized halogen containing vinyl compound and as a stabilizer the product of a reaction between a potassium salicylate in which alkyl radicals having a total of from 5 to 18 carbon atoms are attached to the salicylate nucleus and a dihalide of an alkaline earth metal said reaction being conducted at a temperature at least 140° C.

6. A heat and light stabilized plastic composition containing at least one polymerized halogen containing vinyl compound and as a stabilizer an alkaline earth metal salt of a salicylic acid in which an alkyl radical containing from 8 to 18 carbon atoms is attached to the salicylate nucleus.

7. A heat and light stabilized plastic composition containing at least one polymerized halogen containing vinyl compound and as a stabilizer an alkaline earth metal salt of a salicylic acid in which alkyl radicals having a total of from 5 to 18 carbon atoms are attached to the salicylate nucleus.

8. A composition containing at least one polymer which decomposes with the evolution of hydrogen halide and containing as a stabilizer against such decomposition a metal salicylate in which the metal exhibits a minimum valence of two and in which metal salicylate alkyl radicals having a total of from 5 to 18 carbon atoms are attached to the salicylate nucleus.

PHILIP JAMES GARNER.
PETER GORDON CROFT-WHITE.

REFERENCES CITED

The following references are of record in the file of this patent:

UNITED STATES PATENTS

| Number | Name | Date |
|---|---|---|
| 2,075,543 | Reed et al. | Mar. 30, 1937 |
| 2,240,764 | Driesbach | May 6, 1941 |